US011514948B1

(12) United States Patent
Nair et al.

(10) Patent No.: US 11,514,948 B1
(45) Date of Patent: Nov. 29, 2022

(54) MODEL-BASED DUBBING TO TRANSLATE SPOKEN AUDIO IN A VIDEO

(71) Applicant: Amazon Technologies, Inc., Seattle, WA (US)

(72) Inventors: Naveen Sudhakaran Nair, Issaquah, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/738,951

(22) Filed: Jan. 9, 2020

(51) Int. Cl.
| | | |
|---|---|---|
| G11B 27/036 | (2006.01) | |
| G06F 16/23 | (2019.01) | |
| G06F 16/783 | (2019.01) | |
| H04N 7/15 | (2006.01) | |
| H04N 21/2343 | (2011.01) | |
| G06N 3/08 | (2006.01) | |
| G10L 17/00 | (2013.01) | |
| G06N 3/04 | (2006.01) | |

(52) U.S. Cl.
CPC ........ *G11B 27/036* (2013.01); *G06F 16/2365* (2019.01); *G06F 16/7834* (2019.01); *G06N 3/08* (2013.01); *G10L 17/00* (2013.01); *H04N 7/155* (2013.01); *H04N 21/23439* (2013.01); *G06N 3/04* (2013.01)

(58) Field of Classification Search
USPC ................... 704/276, 277, 3, 260; 348/14.01
See application file for complete search history.

(56) References Cited

U.S. PATENT DOCUMENTS

| | | | |
|---|---|---|---|
| 6,925,438 B2 * | 8/2005 | Mohamed ............... | G10L 21/06 715/767 |
| 9,552,807 B2 | 1/2017 | Rossano et al. | |
| 2003/0085901 A1 | 5/2003 | Peleg et al. | |
| 2004/0013252 A1 * | 1/2004 | Craner .................. | H04M 1/247 379/142.01 |
| 2010/0121630 A1 * | 5/2010 | Mende .................... | G06F 40/30 704/7 |
| 2011/0093798 A1 * | 4/2011 | Shahraray ............ | G11B 27/034 715/763 |
| 2014/0025376 A1 * | 1/2014 | Wasserblat .............. | G10L 25/51 704/238 |
| 2021/0042503 A1 * | 2/2021 | Karras ................. | G06N 3/0454 |

FOREIGN PATENT DOCUMENTS

WO     2018090356     5/2018

OTHER PUBLICATIONS

Diego Marcheggiani et al, "Exploiting Semantics in Neural Machine Translation with Graph Convolutional Networks", dated Apr. 23, 2018, pp. 1-8.

* cited by examiner

*Primary Examiner* — Maria El-Zoobi
(74) *Attorney, Agent, or Firm* — S. Scott Foster; Kowert, Hood, Munyon, Rankin & Goetzel, P.C.

(57) ABSTRACT

Model-based dubbing techniques are implemented to generate a translated version of a source video. Spoken audio portions of a source video may be extracted and semantic graphs generated that represent the spoken audio portions. The semantic graphs may be used to produce translations of the spoken portions. A machine learning model may be implemented to generate replacement audio for the spoken portions using the translation of the spoken portion. A machine learning model may be implemented to generate modifications to facial image data for a speaker of the replacement audio.

20 Claims, 10 Drawing Sheets

MODEL-BASED DUBBING TO TRANSLATE SPOKEN AUDIO IN A VIDEO

BACKGROUND

Global communications and distribution systems offer wider availability and accessibility of video content produced from a variety of different locations. Language, however, may still be a barrier in increasing the ability of viewers to consume or participate with this video content. While manual translation services are available, such techniques are costly, slow, and cannot reproduce the original experience of hearing a speaker in their original language. Therefore, translation techniques that can increase the availability and quality of video translations are highly desirable.

Figure 1:
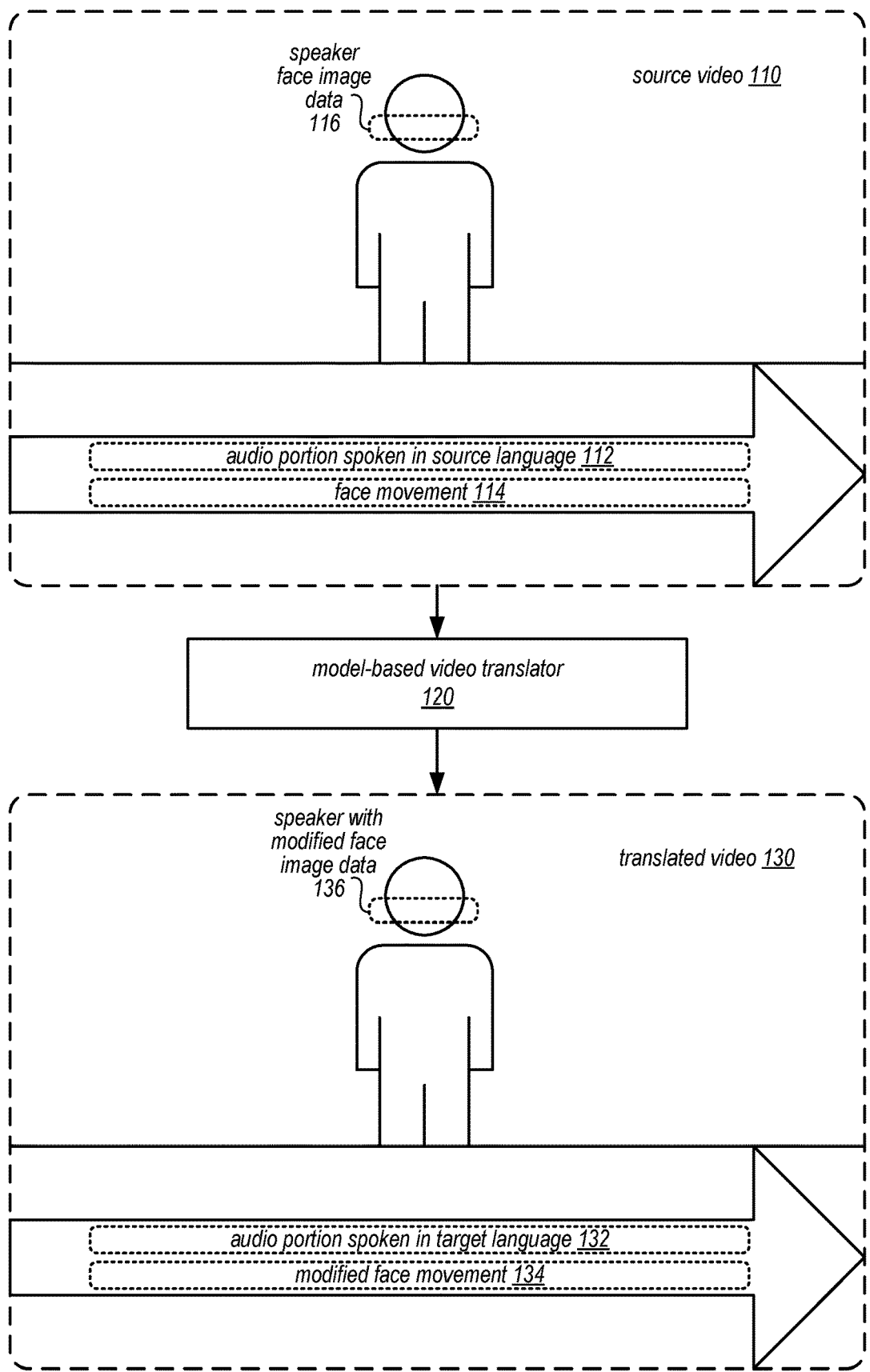
FIG. 1 is a logical block diagram illustrating model-based dubbing to translate spoken audio in a video, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques of model-based dubbing to translate spoken audio in a video are described herein. The accessibility of content produced from many different locations, cultures, and countries offers viewers greater access to new and different material on a scale that was not previously possible. For example, movie industry has produced over 500,000 movies in many languages; the top three movie industries—Bollywood, Nollywood, and Hollywood—produce over 500 movies annually that are watched worldwide. In the making of movies and other video content, video sequences are recorded in an original language. To make the videos more widely accessible, dubbing techniques have been applied to translate a video into different spoken languages. In such scenarios, actors/actresses performing the dubbing in a studio, which takes significant time and repeated attempts to perfectly sync with recorded lip movements in an original video. For an existing video that needs to be translated into a different language, having the best translation and dubbing artists still cannot optimally convey the same experience as viewing a movie in the original language, as the newly-dubbed movie still includes noticeable translation artifacts since the movie recording was done in a different language (e.g., synchronization differences between voice and facial imagery, such as lip movements). Model-based dubbing may be implemented, in various embodiments, to automatically translate, dub and sync voice with facial movements, which can provide fast and efficient translation of video into different languages without any visual or linguistic imperfections. Further, these techniques can be leveraged for real-time use in translating video communications.

As one skilled in the art will appreciate in light of this disclosure, certain techniques of model-based dubbing to translate spoken audio in a video may be capable of achieving certain advantages. For example, model-based dubbing to translate spoken audio in a video can reduce or eliminate the visual artifacts of translating, by adjusting facial movements to match corresponding changes in spoken audio. Moreover, the original speaker's voice may, in some embodiments, be replicated using voice analysis and other techniques, providing a viewing experience for viewers that cannot be achieved using different actors to provide a different voice in the translated language. Real-time or live video communications can be improved to accommodate viewers of different language fluencies without, for instance, closed captioning/sub titles in the translated language.

FIG. 1 is a logical block diagram illustrating model-based dubbing to translate spoken audio in a video, according to some embodiments. In the illustrated example, a source video 110 may be provided to model-based video translator 120. Model-based video translator 120 may be implemented as part of a service, such as translation service 210 discussed below with regard to FIGS. 2-6C below and/or as part of stand-alone applications (e.g., in a device that provides video playback capabilities in order to translate received video) and may implement various translation techniques, such as those discussed below with regard to FIGS. 2-6C and 7-9.

For example, source video 110 may have an extracted audio portion spoken in a source language 112 and corresponding face movements 114 extracted for a series of frames of a speaker with face image data 116 corresponding to the audio portion 112 and face movement 114. Model-based translator may produce a translated version, translated video 120 with an audio portion spoken in a target language 132 with modified face movement 134. In this way, speaker 136 may have modified face image data and spoken audio that appears as if the speaker had spoken in the target language instead of the source language. As discussed in detail below, various types of machine learning models can be implemented to perform the translations of language, modification of audio and image data.

In at least some embodiments, authorization or permission to perform model-based dubbing may be determined using various opt-in, confirmation, or other techniques to obtain explicit authorization to perform various features of model-based dubbing, such as audio extract and analysis, language translation, facial image modification and/or any other features of model-based dubbing. For media content, in one example, authorization may be obtained from copyright holders as well as from the participants in the content (e.g., authorization from actors) to consent to the model-based dubbing. Viewers of content with model-based dubbing may also be notified of the performance of dubbing and provided various notices or other information describing the modifications made (e.g., a transcript of original spoken language or text, a transcript of translated text, markups or indications of facial image modifications, etc.).

FIG. 1 is provided as a logical illustration of model-based dubbing to translate spoken audio in a video, and is not intended to be limiting as to the physical arrangement, size, or number of components, modules, or devices, implementing model-based dubbing to translate spoken audio in a video.

The specification first describes an example of a translation service, according to various embodiments. The example translation service may receive and translate source video into different target languages for many different clients, in various embodiments. Included in the description of the example translation service are various aspects of the example translation service along with the various interactions between the translation service and clients. The specification then describes a flowchart of various embodiments of methods for model-based dubbing to translate spoken audio in a video. Next, the specification describes an example system that may implement the disclosed techniques. Various examples are provided throughout the specification.

Figure 2:
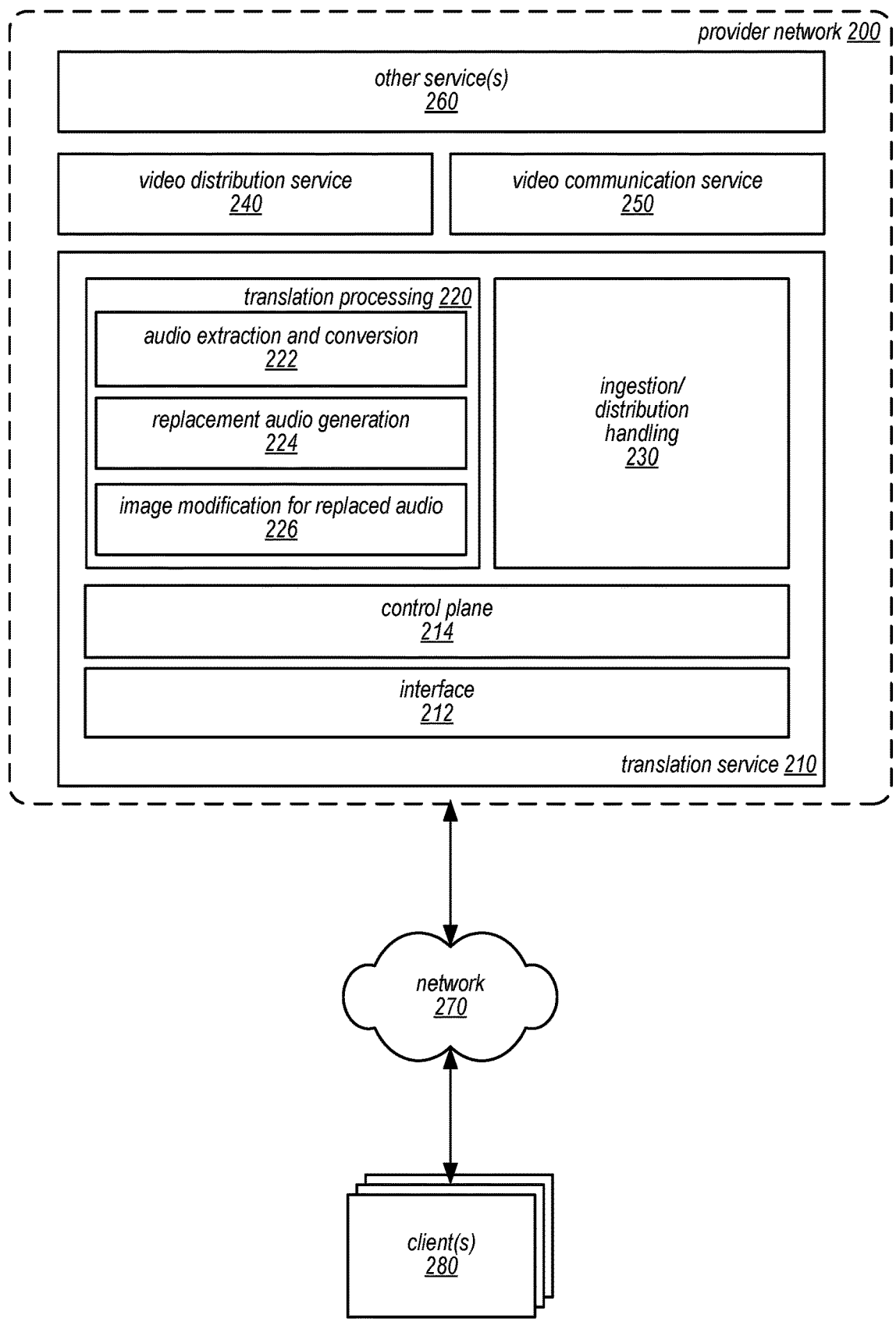
FIG. 2 is a block diagram illustrating a provider network that implements a translation service that implements model-based dubbing to translate spoken audio in a video, according to some embodiments.

FIG. 2 is a block diagram illustrating a provider network that implements a translation service that implements model-based dubbing to translate spoken audio in a video, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may implement a translation service 210, as described herein, and may provide many other computing resources or services 270, such as a virtual compute service and storage services, such as object storage services, block-based storage services, data warehouse storage service, archive storage service and/or any other type of network based services (which may include various other types of storage, processing, analysis, communication, event handling, visualization, and security services)

In some embodiments, provider network 200 may implement a video distribution service 240 (e.g., for uploading and sharing through various communication protocols uploaded videos, such as streaming videos on demand to clients 210) and video communication service 250 (e.g., a video communication service that enables live or real time video communications between two or more participants). Clients 210 may access these various services offered by provider network 200 via network 270. Likewise network-based services may themselves communicate and/or make use of one another to provide different services. For example, various clients of translation service 210 may be implemented within another service or system of provider network 200, such as video distribution service 240 which may provide on-demand translation (or pre-processed translation) of videos for distribution and/or video communication service 210 (e.g., supporting a translation feature between different participants speaking in different languages).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node, server, and/or host, or may be distributed across several nodes/servers/hosts. In some embodiments, a given node, server, or host may implement the functionality of more than one service system component (e.g., more than one database service system component).

Translation service 210 may provide translated versions of source videos that replace audio portions spoken in a first language with translated audio portions in a second language, along with modified facial image data to match the translated audio. In some embodiments, the translated audio may be performed in the same voice as the original speaker. Translation service 210 may offer various features, such as dubbing services for content producers (e.g., movies, television shows, live broadcasts of news, sporting, or other events) or support for translating and returning content used in other applications (e.g., video communications, gaming, etc.). Translation service 210 may offer various languages which may be specified and/or interact with clients in various ways, as discussed below with regard to FIGS. 6A-6C.

Translation service 210 may implement interface 212, which support various interactions with translation service 210. For example, interface 212 may support various programmatic interfaces (e.g., APIs) which can request, upload, modify, receive, or direct translation of source videos, in some embodiments. In some embodiments, interface 212 may include a graphical user interface (GUI), such as may be implemented as part of a web-based console. In some embodiments, interface 212 may include a command line interface (CLI).

Translation service 210 may implement control plane 214, in some embodiments, which may implement various control functions to manage translation processing 220 and distribution handling 230 and other components of translation service 210 that translate source videos, such as dispatching or direction translation jobs, streams, or other assignments of translation processing and distribution. For example, control plane 214 may manage different pools of translation processing resources 220 dedicated to perform translation different source and target languages so that resources for performing a specific translation task may be quickly obtained and started on a translation.

To provide heat management, for example, control plane 214 may collect performance metrics from the various resources implementing translation processing 220 and ingestion/distribution handling 230. Each resource may have various thresholds for performance characteristics, such as memory utilization, CPU utilization, disk utilization, and request-rate capacity. When a resource reports metrics that exceed a threshold (or multiple thresholds), control plane 214 may direct the migration of one or more tasks to different resources to balance workloads or handle failures.

Translation processing 220 may be implemented, in various embodiments, as part of translation service 210 to perform the translation, replacement of audio, and modification of image data in order to provide a translated version of a video. As discussed in detail below with regard to FIGS. 3-5 and 7-9, translation processing may implement audio extraction and conversion 222 for received source videos in order to perform replacement audio generation 224, and image modification for replaced audio 226. Translation processing 220 may be distributed across one or multiple different resources (e.g., nodes, servers, or host systems). Requests to perform translation may be dispatched from control plane 214, which may accept as input a source video from ingestion/distribution handling 230 and return a translated version to ingestion/distribution handling 230, in various embodiments. In some embodiments, dubbings of multiple languages may be included as part of a single output of translation processing 220 (e.g., allowing for different languages versions to be selected upon playback). In some embodiments, translation processing may provide a translation function to allow for a playback device to perform at least some of the computation to generate the translated version (e.g., similar to the way JPEG encoders can communicate the quantization table used in the image compression).

In some embodiments, translation processing 220 may embed or encode within the output video indications of the modifications made. For example, watermarks, or other visual modifications may be included to indicate the presence of modifications. In this way, when playback of the translated video occurs, video playback applications can provide indications of what portions of a video were modified (e.g., (e.g., overlay a certain color or indication on the video to show portions of face that were modified). Using such information, a user can turn on/off the modification indicator feature. In some embodiments, if this additional data is too large to embed in the video itself, a link to a remote resource can be provided.

Ingestion/distribution handling 230 may provide the support for various communication protocols to receive and transmit source videos and translated versions of the videos, in various embodiments. For example, one or multiple ingestion resources (e.g., nodes, servers, or host systems) may support data transfer or other communications protocols as a network target or other endpoint for receiving a video from a client. In some embodiments, various pre-processing or format conversion techniques may be implemented as part of ingestion, such as various security techniques to prevent receiving or uploading malicious software. Similarly, one or multiple distribution resources (e.g. nodes, servers, or host systems) may support data transmission or other communications protocols as a data transmitter to send a translated version of video to a network target (e.g., either video distribution service 240, video communication service 250 or other internal or external client 280.

Generally speaking, clients 280 may encompass any type of client configurable to submit network-based services requests to provider network 200 via network 270, including requests for translation services (e.g., a request to translate a source video to translation service 210, etc.). For example, a given client 280 may include a suitable version of a web browser, or may include a plug-in module or other type of code module configured to execute as an extension to or within an execution environment provided by a web browser. Alternatively, a client 280 may encompass an application such as a media application, an office application or any other application that may make use of translation services to perform techniques like video content playback. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 280 may be an application configured to interact directly with provider network 200. In some embodiments, client 280 may be configured to generate network-based services requests according to a Representational State Transfer (REST)-style network-based services architecture, a document- or message-based network-based services architecture, or another suitable network-based services architecture.

Clients 280 may convey network-based services requests (e.g., translation requests to translation service 210) to and receive responses from provider network 200 via network 270. In various embodiments, network 270 may encompass any suitable combination of networking hardware and protocols necessary to establish network-based-based communications between clients 280 and provider network 200. For example, network 270 may generally encompass the various telecommunications networks and service providers that collectively implement the Internet. Network 270 may also include private networks such as local area networks (LANs) or wide area networks (WANs) as well as public or private wireless networks. For example, both a given client 280 and provider network 200 may be respectively provisioned within enterprises having their own internal networks. In such an embodiment, network 270 may include the hardware (e.g., modems, routers, switches, load balancers, proxy servers, etc.) and software (e.g., protocol stacks, accounting software, firewall/security software, etc.) necessary to establish a networking link between given client 280 and the Internet as well as between the Internet and provider network 200. It is noted that in some embodiments, clients 280 may communicate with provider network 200 using a private network rather than the public Internet.

Figure 3:
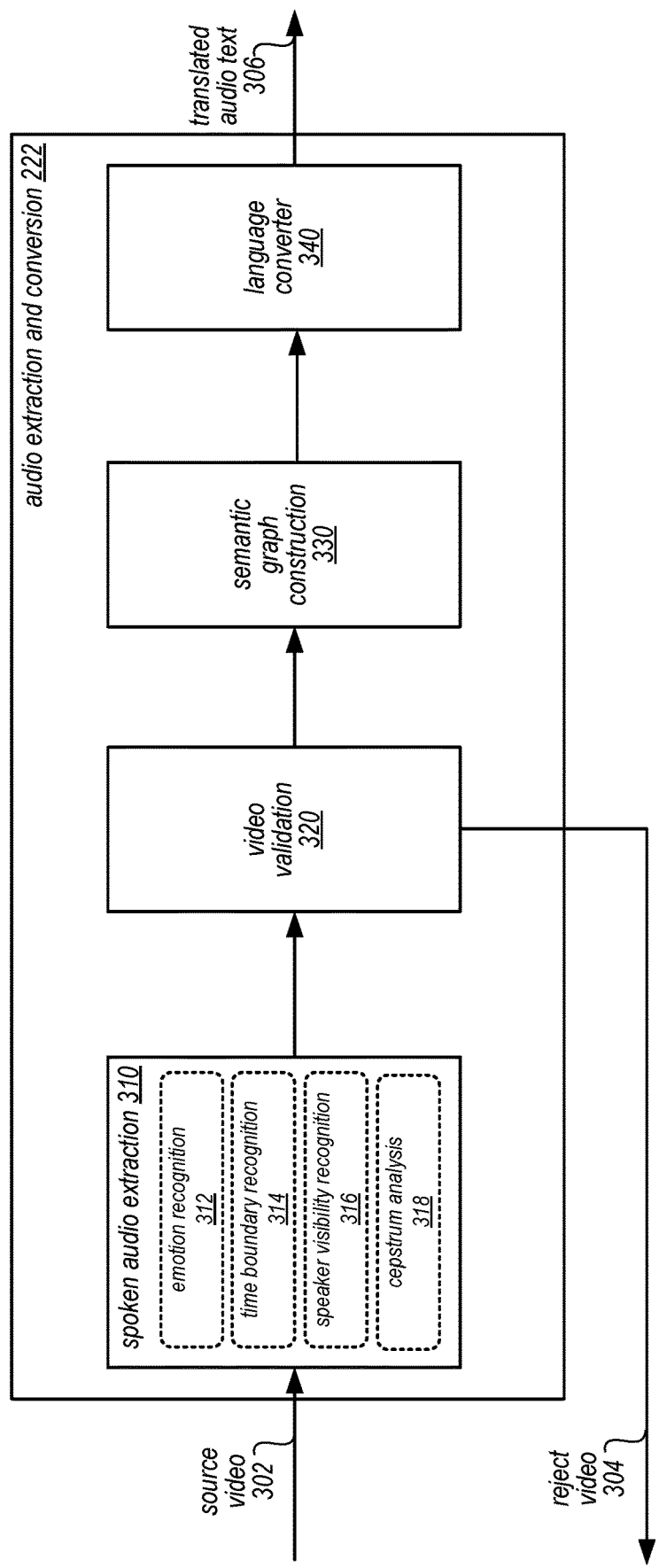
FIG. 3 is a block diagram illustrating audio extraction and conversion for a source video, according to some embodiments.

FIG. 3 is a block diagram illustrating audio extraction and conversion for a source video, according to some embodiments. Audio extraction and conversion 222 may identify various features of spoken audio that can be used to perform the translation of the audio into a target language, in some embodiments. In various embodiments, authorization or permissions to perform audio extraction and For example, received source video 302 may be provided to spoken audio extraction 310. As discussed below with regard to FIG. 7, various features of source video 302 may be extracted or otherwise determined. One feature may be emotion recognition 312, in some embodiments. Emotion recognition 312 may evaluate spoken audio portions using a neural network trained to identify emotions in a spoken audio portion. For instance, different audio portions that provide a labeled set of voice examples of emotions may be used to train the neural network to provide one or more emotional identifications (e.g., labels such as "happy", "sad", "surprised", "angry", "afraid", and so on). In some embodiments, emotion recognition 312 may be trained or updated based on the results or feedback received for translated audio portions generated by translations service 210. In some embodiments, similar emotion recognition techniques may be applied to image data (e.g., to classify facial expressions with emotional labels). In some embodiments, mood or other emotion indicators may be determined from other content of a source video, such as background music indicating a mood.

Time boundary recognition 314 may be implemented, in some embodiments. Frames, segments, or other or other portions of the source video that correspond to different respective speech may be identified, as discussed below with regard to FIG. 7. The amount of time that the speakers face is visible for speaking the dialogue may also be determined. In this way, the amount of time that replacement audio can occupy is determined from the time the speakers dialogue is visible. In this way, other speakers or changes in scene do not include spoken audio not associated with them.

Figure 5:
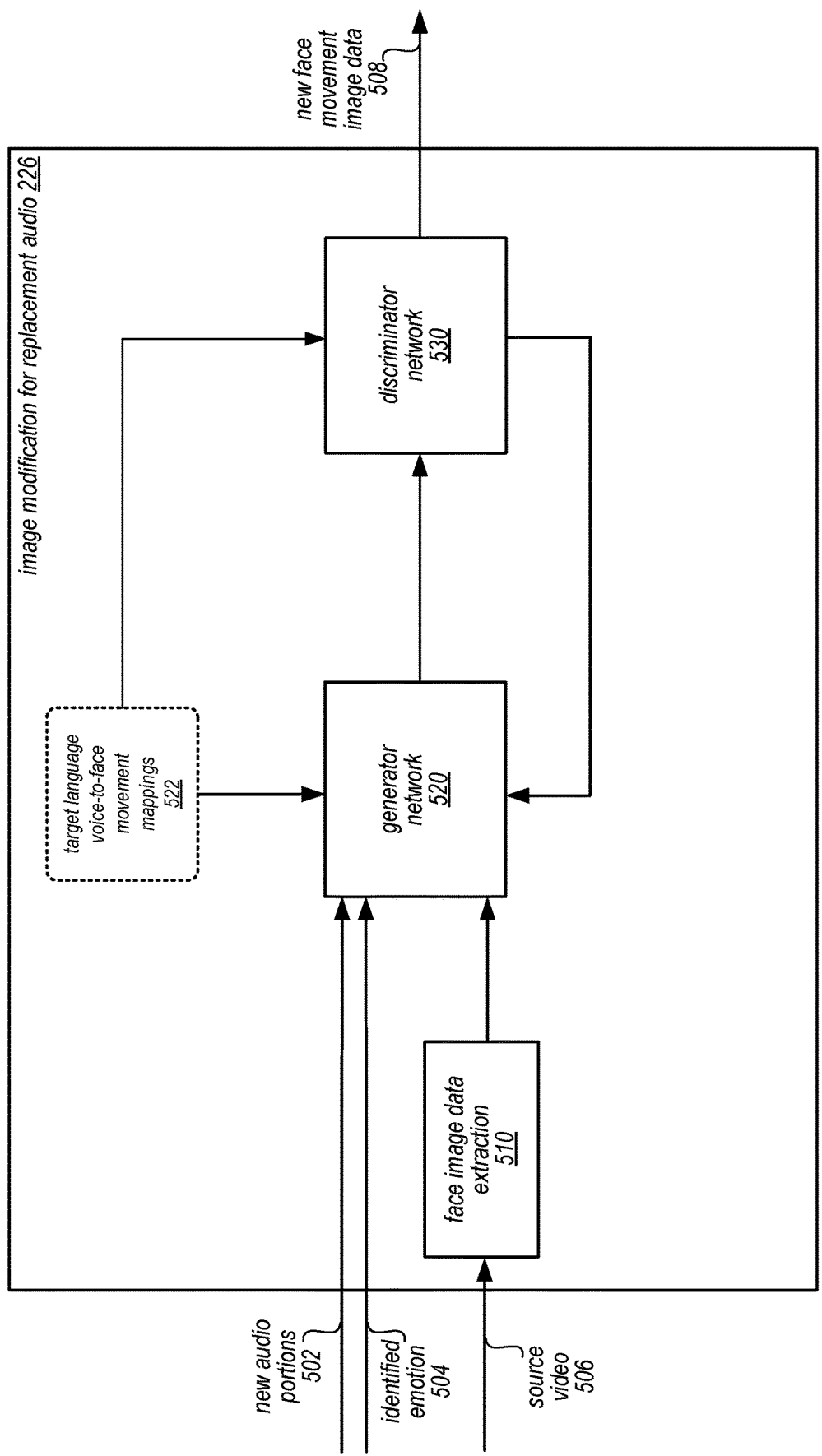
FIG. 5 is a logical block diagram illustrating image modification generation for a source video, according to some embodiments.

As indicated at 316, speaker visibility recognition may be implemented, in some embodiments. Various scenes may have spoken audio with or without a visible speaker. A speaker may not be facing a camera (e.g., a scene filmed that is focused on a listener of the speaker), voiceovers, or various other scenarios where the speaker is not visible. Those portions (even if in the middle of dialogue that may or may not have the focus switch back and make the speaker visible) may be identified so that facial image data modification as discussed below with regard to FIG. 5 is not performed.

In various embodiments, replacement audio may be generated in the same voice as the speaker in the source audio. Cepstrum analysis 318 may be implemented to capture the features of a speaker's voice, so that the features can be replicated and/or manipulated, in some embodiments. For example, in some embodiments, the cepstrum analysis may include performing an inverse Fourier transform (IFT) of the logarithm of an estimated signal spectrum for a speakers voice. The resulting cepstrum (or cepstral) may be used for voice generation and manipulation matching the same features of the voice captured in the source audio.

As indicated at 320, video validation may be performed, in some embodiments, which may determine whether a submitted source video is valid for translation. For example, various techniques discussed in detail below with regard to FIGS. 6A and 9 may be implemented to determine whether a video is valid. Invalid videos may be rejected, as indicated at 304.

Semantic graph construction 330 may be implemented, in various embodiments, to produce a semantic graph of the source video spoken portions. For example, as discussed below with regard to FIG. 7, different segments, or other portions of the source video that correspond to different respective speech may be identified by performing cepstrum analysis 318, to identify the features of different voices. Semantic graph construction 330 may encode words recognized in the speech to represent the parts, functions, and roles of the words in the relationships identified by the graph structure (e.g., the branches between the words or phrases represented as graph nodes).

Audio extraction and conversion 222 may implement language converter 340, in various embodiments, to produce translated audio text 306 for spoken portions. For example, as discussed below with regard to FIG. 7, one model or combinations of translation models can be implemented, such as rule-based machine translation, statistical-based translation techniques, and/or trained neural network models. In some embodiments, different language translation models may be maintained for different language translation options that may be supported by translation service 210 (e.g., English to Hindi, Spanish to German, Arabic to Chinese, Nigerian to French, and so on).

Figure 4:
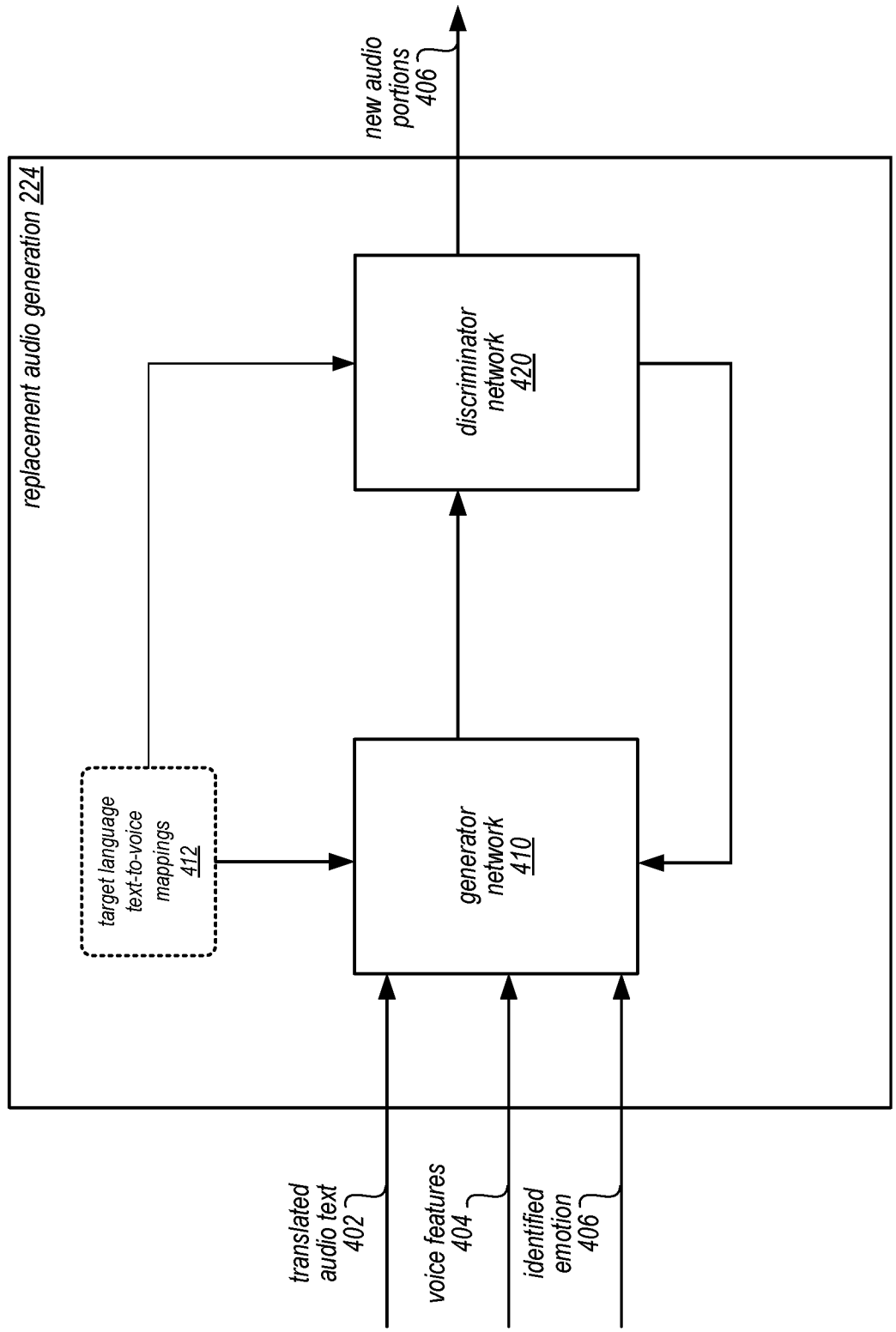
FIG. 4 is a block diagram illustrating replacement audio generation for a source video, according to some embodiments.

FIG. 4 is a block diagram illustrating replacement audio generation for a source video, according to some embodiments. In at least some embodiments, a generative adversarial network may be implemented to perform audio modifications to replace source audio portions with audio portions using the same voice in a translation of a target language. For example, replacement audio generation 224, may implement target language text-to-voice mappings 412, in some embodiments. Target language text-to-voice mappings 412 may include mappings between different vowels, consonants, and other language features and the respective sounds to produce those vowels. Different target language text-to-voice mappings 412 may be implemented for different target languages.

Replacement audio generation 224 may implement generator network 410. Generator network 410 may be a neural network that generates candidate audio portions with a voice speaking the translated audio text 402 (instead of the text spoken in the source video), in some embodiments. Replacement audio generation 224 may receive voice features 404 and identified emotion 406 (which may be determined according to the techniques discussed above with regard to FIG. 3). Generator network 410 may then create replacement audio using the voice features 404 and identified emotion 406 to produce a voice that mimics (in some scenarios indistinguishably mimics) the voice of the original speaker as if the original speaker spoke the translated audio text 402. The candidate replacement audio of generator network 410 may then be submitted to discriminator network 420.

Discriminator network 420 may be trained to identify true or false translated text-audio pairings, in some embodiments. Thus, when a candidate replacement audio is received, discriminator network 420 may accept or reject the candidate, which rejected candidates trigger another attempt by generator network 410 and for accepted candidates to be output as new audio portions 406 to replace source audio portions with the translated text. In this way, networks 410 and 420 are updated such that the generator network 410 produces better replacement audio while the discriminator network 420 becomes more skilled at identifying modified audio data for a given voice. Similar to generator network 410, discriminator network 420 is trained from known target language text-to-voice mappings 412. From this training, discriminator network 420, may determine if a given voice for a text is true or artificial. Implementing GANs, such as the illustrated GAN, in FIG. 4, may allow for translation service 210 to produce replacement audio in the source videos that translates the same voice into the target language in a way that would not be distinguishable as synthetic, by humans (or even by efficient algorithms in some scenarios).

FIG. 5 is a logical block diagram illustrating image modification generation for a source video, according to some embodiments. In at least some embodiments, a generative adversarial network may be implemented to perform image modification generation for a translated video in order to modify facial image data to match the movements that would be expected if the face were to speak in the translated language using the same voice as the original speaker (modified according to the techniques discussed above with regard to FIG. 4. For example, image modification for replacement audio 226 may implement target language voice-to-face movement mappings 522, which may show various vowel, consonant, emotion, and other facial positions that correspond to these various features of speaking. Different mappings 522 (as well as different generator networks 520 and discriminator networks 530) may be implemented for different languages, in some embodiments.

Generator network 520 may be a neural network that generates candidate modifications to facial image to match the changes the translated audio of a source video, in some embodiments. Image modification for replacement audio 226 may implement face image data extract 510 to obtain the portions of image data from source video 506 (e.g., of individual frames in the source video for the portion of the source video being modified), in some embodiments. For example, face image data extraction 510 may identify the pixel boundaries of lips (of a speaking person) in a video frame. Generator network 520 may then create modifications to the extracted facial image data based on new audio portions 502 (e.g., generated as discussed above with regard to FIG. 4) and identified emotion 504 (e.g., extracted as discussed above with regard to FIG. 3). The candidate modifications of generator network 520 may then be submitted to discriminator network 530.

Discriminator network 530 may be trained to identify true or false audio-video pairings, in some embodiments. Thus, when a candidate modification is received, discriminator network 530 may accept or reject the candidate, which rejected candidates trigger another attempt by generator network 520 and for accepted candidates to be output as new face movement image data 508. In this way, networks 520 and 530 are updated such that the generator network 520 produces better images while the discriminator network 530 becomes more skilled at identifying modified frames for a given voice. Similar to generator network 520, discriminator network 530 is trained from known voice-to-face movement mappings 522 in the target language. From this training, discriminator network 530, may determine if a given lip movement for a specific audio is true or artificial. Implementing GANs, such as the illustrated GAN, in FIG. 5, may allow for translation service 210 to produce modified image data in the source videos for translated audio that would not be distinguishable as synthetic, by humans (or even by efficient algorithms in some scenarios).

Figure 6A:
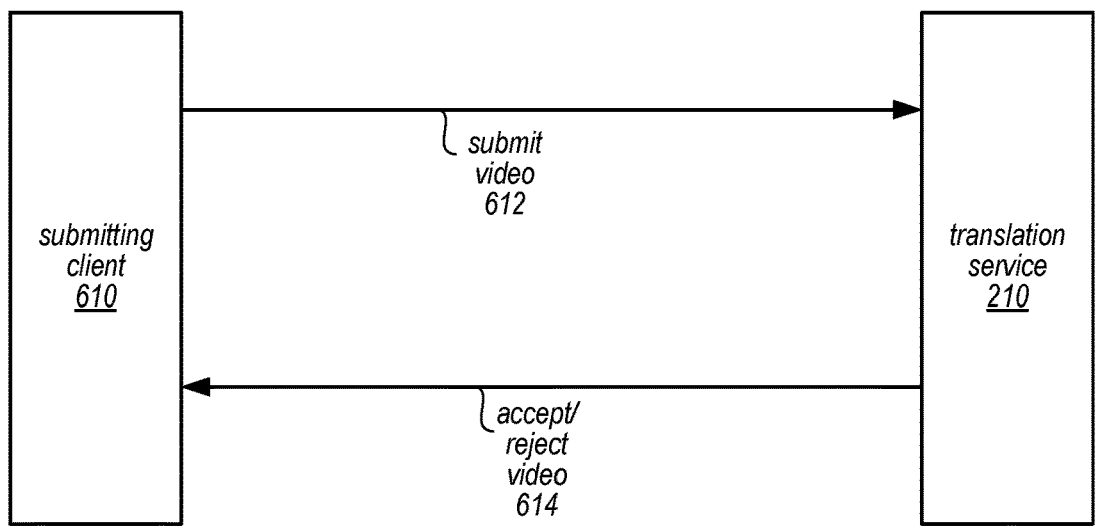
FIGS. 6A-6C illustrate example interactions with a translation service, according to some embodiments.
Figure 6B:
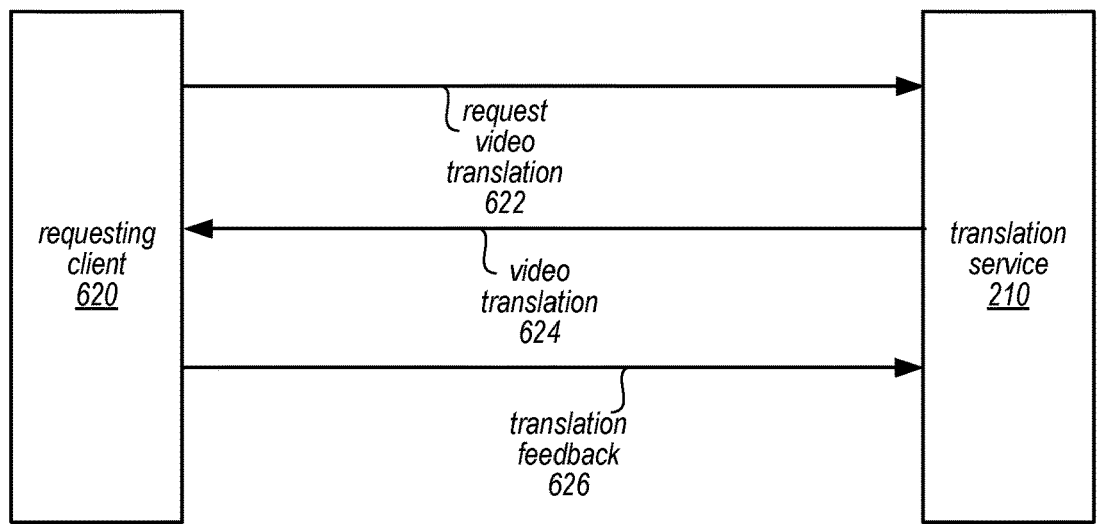
Figure 6C:
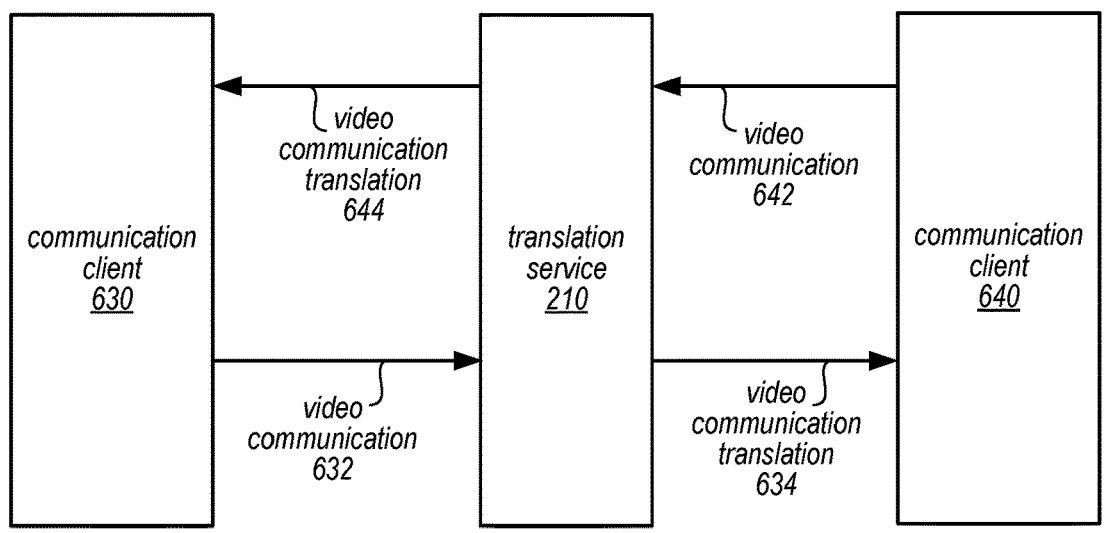

Model-based dubbing to translate spoken audio in a video may be incorporated into many different systems or services. FIGS. 6A-6C illustrate example interactions with a translation service, according to some embodiments, which may be implemented or performed as part of these different systems or services. For example, in FIG. 6A, a submitting client 610 may be a source video producer or generator. Media companies (e.g., move or television studios, news networks, or other video content creators) may submit 612 video files (or streams for real-time translation) to translation service 210. In some embodiments, submitting client 610 may be an individual creator utilizing a video sharing service, social media service, or other distribution service for videos.

Submit video request 612 may include, direct, otherwise cause the transfer of the video to translation service 210. In some embodiments, request 612 may specify the target language(s) that can be translated to. In some embodiments, other features that control translation, such as whether to translate other languages outside of a specified translation pairing (e.g., English to Spanish) so that another language (e.g., German) spoken in the video remains untranslated just as the language is not translated in the source video (e.g., producing a translated version of the source video in Spanish with the German portions remaining German).

Translation service 210 may accept or reject the submitted video request 612. As discussed below with regard to FIG. 9, different criteria for determining the validity of the video may be evaluated. An indication of the acceptance or rejection of the video, as indicated at 614, may be sent. In some embodiments, the indication 614 may identify corrective actions or reasons for the rejection.

In some embodiments, translation of videos can be performed in response to a request. Requesting client 620 may send a request for a video translation, as indicated at 622. The request may specify the target language (or languages) of the video which may be obtained by translation service 210 and provided, as indicated at 624. In some embodiments, translation may be performed on incremental portions of a source video. For example, a movie or other longer video may be divided into incremental portions that are translated and sent 624 so that playback of the translated video may begin.

In order to train, update, or otherwise improve performance of translation service 210, translation feedback 626 may be provided by a requesting client 620 (or other client that receives video translation 624). For example, requesting client 620 can provide a review at the end of playback for video translation 624 that identifies odd words or phrases that were performed. In some embodiments, a score or rating may be provided as feedback 626. In some embodiments, a viewer fluent in both an original language and the translated language can opt-in to review translated and source portions and provide translation suggestions. Translation service 210 may implement different training and modification techniques to include translation feedback 626. For example, scores or ratings may be compared with confidence scores of translated versions of video to determine whether an adjustment to a minimum threshold for providing a translation should be made. In some embodiments, the scoring may be implemented as part of labeled set of training data to apply a machine learning training technique to one or multiple ones of machine learning models used to generate the translated version.

In some embodiments, translated versions may be generated as part of a video communication or other "live" distribution of video. For example, live media broadcasts (e.g., sporting events, public ceremonies, etc.) can be translated in approximately real time (e.g., with a small delay, such as a 2 or 3 second delay). In some embodiments, a video communication may be implemented as part of video calls or other private communications. In such scenarios, translation service 210 may enforce privacy guarantees, data access restrictions, and various other regulatory and consumer protection standards to ensure the privacy of data obtained as part of performing a translation. For example, data objects created as part of a translation, such as semantic graphs, or other intermediate data may be discarded and irretrievably deleted after completion of the video communication. Various encryption or isolation techniques may be applied to prevent data leaks or other privacy invasions during the time in which video communication data is present in translation service 210.

As illustrated in FIG. 6C, translation service 210 may serve as an intermediary between communication clients 630 and 640. For instance, communication clients 630 and 640 may be mobile (or non-mobile) computing devices, such as mobile phones, that implement a video communication application that incorporates or utilizes translation service 210. Each communication client 630 may generate source video in a language different than the other participant in the video communication. The respective video communications 632 and 642 may be provided to translation service 210, which may provide translated versions of the video communication 634 and 644 to each participant.

Figure 7:
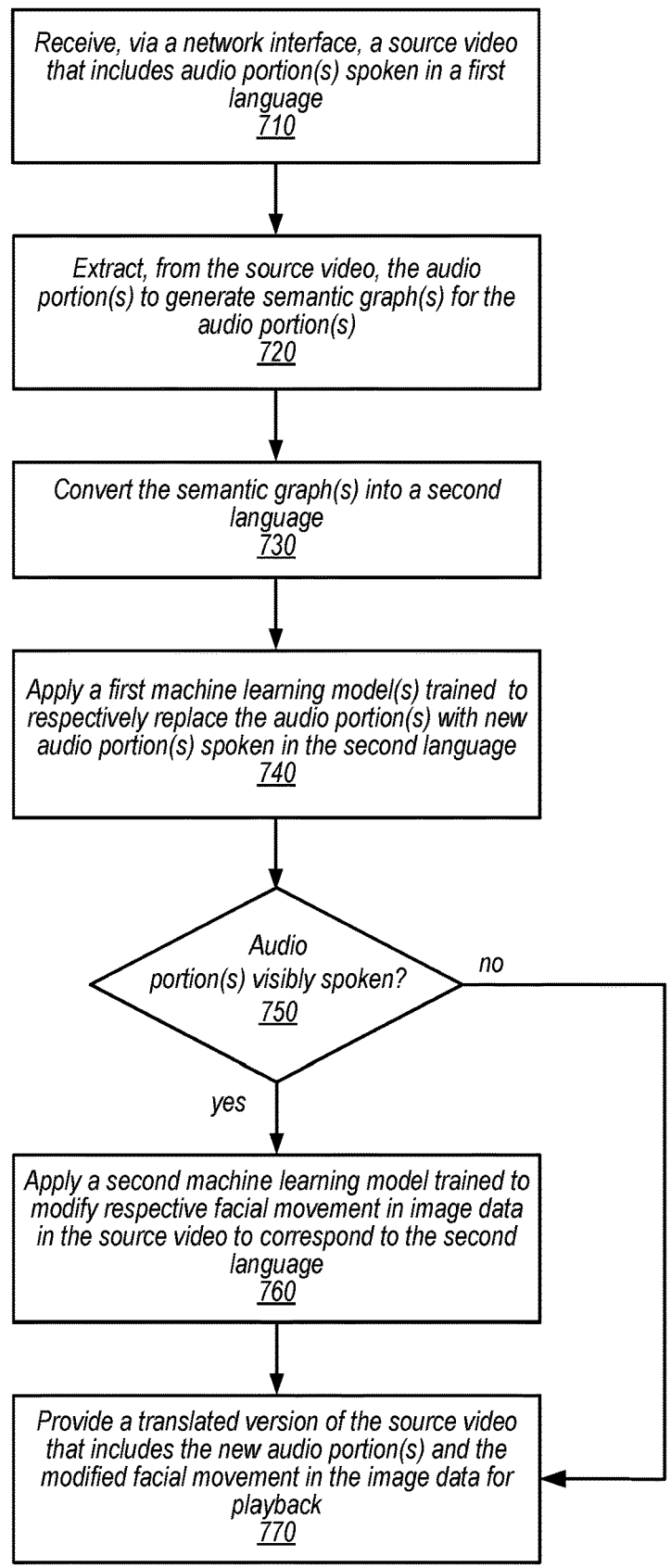
FIG. 7 is a high-level flowchart illustrating methods and techniques to implement model-based dubbing to translate spoken audio in a video, according to some embodiments.

The translation service discussed in FIGS. 2 through 6 provide examples of translation for received source video. However, various other types of systems or services, such as communications, content sharing and/or distribution, image or graphics processing systems, may implement model-based dubbing to translate spoken audio in a video. FIG. 7 is a high-level flowchart illustrating methods and techniques to implement model-based dubbing to translate spoken audio in a video, according to some embodiments. Various different systems including the embodiments described above may implement the techniques described below with regard to the various flowcharts.

As indicated at 710, a source video may be received via a network interface, in some embodiments, that includes audio portion(s) spoken in a first language. For example, various human languages may be spoken and a source audio may include one or multiple different languages. For source video with multiple languages, multiple iterations of the techniques may be discussed below may be performed to translate all different languages. In other embodiments, a specified translation (e.g., from English to French) may be performed while other non-specified languages spoken in the source video (e.g., Spanish) may not be translated. In some embodiments the source video may be received along with a request to translate the source video. The request may specify a language that is the target or destination language. In some embodiments, the video may be received with one or more translation performance parameters, such as requests to prioritize speed (with potentially lower audio/video quality) or prioritize quality.

As indicated at 720, audio portion(s) may be extracted to generate semantic graphs(s) for the audio portions, in some embodiments. For example, different segments, or other portions of the source video that correspond to different respective speech may be identified by performing cepstrum analysis, to identify the features of different voices. In scenarios where multiple speakers are present, individual portions for individual speakers may be extracted (including extracting a single voice when another voice is speaking at a same or overlapping time). Speech recognition techniques may be applied, in various embodiments, to determine the language content of the spoken portions. For example, Hidden Markov Models, Neural Network-based models, or End-to-end Automatic Speech Recognition (ASR), may be implemented to recognize the words in the spoken language of the source video, in some embodiments. Semantic graph generation may encode words recognized in the speech to represent the parts, functions, and roles of the words in the relationships identified by the graph structure (e.g., the branches between the words or phrases represented as graph nodes).

As discussed above with regard to FIG. 3, various other features of the source video may be extracted, such as emotional content, speaker visibility, and/or time boundaries for the spoken audio. For example, audio portions may be evaluated by a convolutional neural network trained to identify emotions in a spoken audio portion. In some embodiments, facial image data may be included in emotional content recognition, by evaluating facial expressions in addition to the spoken audio. Time boundaries for replacing spoken audio may also be extracted, in some embodiments. For example, while the length of time for spoken audio may change given different translations word content, pronunciation, or other factors, the time that a face is visible to perform the dialogue may be limited. Similarly, other speakers may begin to speak so that the time for spoken audio is bounded without overlapping (if not overlapping in the source). Therefore, in addition to audio portion(s) the maximum length of time that those audio portions can be converted into may be determined (e.g., 12.3 seconds, or from time 1 to time 2 in the video).

As indicated at 730, the semantic graph(s) may be converted into a second language, in various embodiments. The second language, as discussed above may be specified in a request or previously determined if the translation is performed as part of a batch translation of a source into a standard/pre-defined set of languages. Various techniques for converting the semantic graph(s) may be implemented. For example, one model or combinations of translation models can be implemented. Rule-based machine translation can be employed to provide techniques for identifying grammar rules, syntax, and other form features for language as well supplying dictionary definitions for defining or translating terms. In some embodiments, statistical-based translation techniques may be performed to guide or correct the output of rules-based translation, in order to adjust the translation. In some embodiments, neural network models may be used to train translations of language from one language to another based on training data used for the translation from the first language to the second language. In some embodiments, different language translation models may be maintained for different language translation options that may be supported by a system that implements model-based dubbing to translate spoken audio in a video (e.g., English to Hindi, Spanish to German, Arabic to Chinese, Nigerian to French, and so on).

As indicated at 740, a first machine learning model (or multiple machine learning model(s) trained to respectively replace the audio portion(s) with new audio portions spoken in the second language, in various embodiments. For example, as discussed above, a generative adversarial network (GAN) may be implemented to produce voice audio portions to replace the audio portions identified by the extraction with the translated portions. However, in other embodiments, other models may be implemented. For example, a neural network for generating the voice data may be used without a corresponding discriminator network to accept (or reject) the proposed replacement voice data. Instead, other voice data generation models (including synthetic voice generation not based on an original speakers voice features) may be used. In some embodiments, scoring criteria to select from amongst the multiple voice generation models may be used, such as by comparing confidence or quality scores assigned to the generated voice data by the different models and selecting the voice audio with the highest confidence score. In at least some embodiments, as discussed above with regard to FIG. 4, voice features identified by a cepstrum analysis may be used to generate spoke audio that simulates the sounds or features of the voice of the original speaker, to make the new audio appear to sound as if the original speaker had spoken words in the translated language.

In some scenarios, some audio portions may not be spoken by a visible speaker. A voice-over for instance may rely upon images displayed without the speakers face. In some scenarios, another person listening may visible in the audio. These scenarios and others in which a speaker's face is not visible may be identified. As indicated by the negative exit from 750, the translated version of the source may be provided with the audio portions but without modifying facial image data for those spoken portions of audio.

As indicated 760, a second machine learning model trained to modify respective facial movement in image data in the source video to correspond to the second language may be applied, in some embodiments. For example, as discussed above with regard to FIG. 2, generative adversarial networks may be implemented to generate modified facial movements to replace the facial movements of a speaker in the first language with corresponding movements in the second language. In some embodiments, other models may be used. For example, a generative neural network without a discriminator network may be applied, or other deep learning techniques. In some embodiments the facial data modified may include lip movements, jaw movements, check movements, eyes or eyebrow movements, and forehead movements, among others.

The translated audio portions and modified facial image data may be incorporated back into the source vice, updating the source video to be a translated version of the source video that includes the new audio portion(s) and the modified facial movement. As indicated at 770, this translated version may be provided for playback, in various embodiments. For example, as discussed above with regard to FIGS. 6A-6C, the translated version may be stored or streamed. In some embodiments, the translated version may be intercepted or incorporated into a video communication to provide real-time translation of video communications between multiple participants.

As discussed above with regard to FIG. 2, once produced, translated versions of source video may still be evaluated for improving the performance of translations, new audio generation, and/or facial image data modification, in various embodiments. For instance, viewer feedback may be solicited and/or sent by a viewer to indicate the quality, realism, synchronization between facial movement and spoken audio, emotional content accuracy, and/or various other features (e.g., by providing numerical or other indications, such as "thumbs up" or "thumbs down", a scale of "one to five", etc.). Such feedback may be used to tune or update the performance of models used to generate the new translations, audio, and/or facial image data modification. For instance, language-specific models for translation, new audio generation, and/or facial image data (e.g., from English to Spanish, from French to Chinese, etc.) may be retrained or modified (or replaced) once a threshold number of feedback has been collected for that specific language. Consider a scenario where language specific models have been trained or tuned for video translations from videos from a certain timeframe (e.g., recent movies of the last thirty years). If a much older video outside of that timeframe were received, various features of the older video may not be as accurately characterized (e.g., out of date slang may result in different language translations and/or emotional identifications). Feedback may be used to help identify when certain translated versions of a video, such as the older video in the example, are not accurately translated, in various embodiments.

Figure 8:
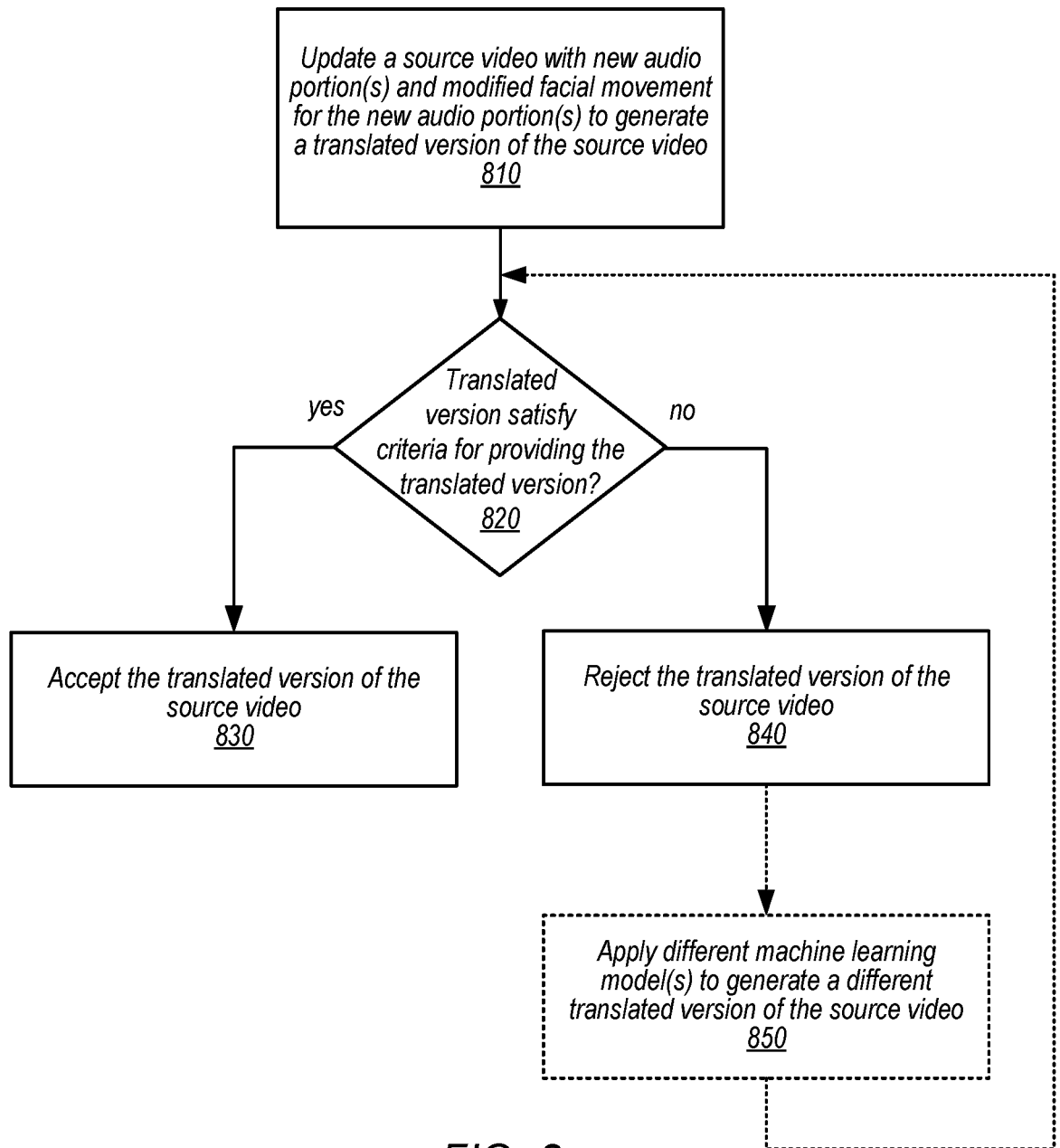
FIG. 8 is a high-level flowchart illustrating methods and techniques to implement determining whether to accept a translated version of source video, according to some embodiments.

In some embodiments, post-translation performance analysis may be used as a quality control on translations. Various audio and/or image criteria may be used to detect poor quality audio generation or facial image modification. For instance, if a translated version of the source video generates video or sound artifacts that distract or distort from viewing the translated version of the video, then post-translation performance analysis may identify translated versions that are not of sufficient quality to provide (and/or for error correction to remove such artifacts). FIG. 8 is a high-level flowchart illustrating methods and techniques to implement determining whether to accept a translated version of source video, according to some embodiments.

As indicated at 810, a source video may be updated with new audio portion(s) and modified facial movement for the new audio portion(s) to generate a translated version of the source video, in some embodiments. As discussed above with regard to FIG. 7, different machine learning models, such as the adversarial generative networks discussed above with regard to FIGS. 2-5, may be applied to produce and integrate the translated audio into a received source video. This updated source video may then be evaluated according to one or more criteria for providing the translated version. For example, criteria may include various quality or other performance characteristics for detecting artifacts or other anomalies in visual, audio, and language translations in the translated version of the source video. Visual performance criteria may, among other artifacts, evaluate for splicing errors, image asymmetries, image noise, or other detectable anomalies introduced because of facial image modification. Similarly, criteria for audio generation, including splicing errors, background noise amplification, and other audio anomalies may be detected.

Evaluations of translated versions of source video may, in some instances, sample portions of the translated version (instead of the entire video), in some embodiments. In this way, more sensitive analysis for different criteria (e.g., computationally intensive image anomaly detection) can be performed without delaying distribution of video that satisfies the criteria. As indicated by the positive exit from 820, if a translated version of the video satisfies the criteria for providing the translated version, then the translated version of the source video may be accepted, as indicated at 830, in some embodiments. For example, the translated version of the video may be stored, streamed, or otherwise provided, as discussed above with regard to FIG. 7.

As indicated by the negative exit from 820, if the translated version of the source video does not satisfy the criteria for providing the translated version, then as indicated at 850, the translated version of the video may be rejected, in some embodiments. For instance, the rejected version may trigger an error message or indication to a client that requested the video. In embodiments where translation is being performed on a source video for a video communication, an error indication indicating that the video translation is not available (e.g., until translation again provides sufficient quality to satisfy the criteria). In some embodiments, a reduced translation mode with audio-only translation may be provided if the portion of the translated version that does not satisfy criteria is related to image data.

As indicated at 850, in some embodiments, for rejected translations, one or more different machine learning models may be applied to generate a different translated version of the source video. If, for instance, initial translations are performed by less computationally expensive models then more computationally expensive models may be selected. In some embodiments, the different machine learning model applied may correspond to the portion of the translated version that did not satisfy the criteria. For example, if the audio portion failed to satisfy performance criteria, then a different model (which may include the same general model or technique with modified parameters, settings, or other information used to generate the new audio or image data) for generating new audio data may be used. As indicated by the arrow back to element 820, the updated translation version generated according to the different machine learning models may be again evaluated. Thus, in some embodiments, an iterative process to determine a satisfactory translated version may be implemented (e.g., in scenarios where translated versions of source video are pre-computed and stored so that they can be made available when requested without performing on-demand translation).

Figure 9:
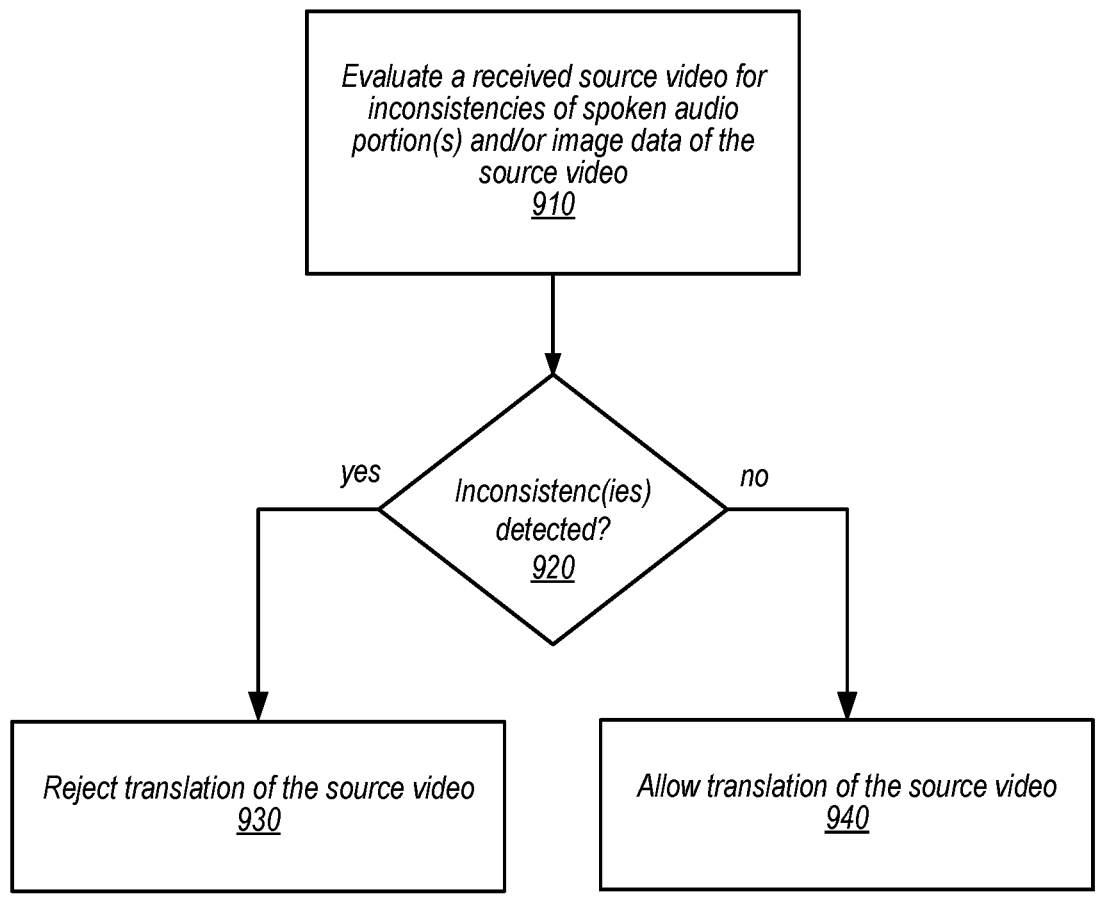
FIG. 9 is a high-level flowchart illustrating methods and techniques to implement determining whether to accept a source video for translation, according to some embodiments.

As discussed above with regard to FIG. 2, in some scenarios some videos submitted for translation may not be eligible for translation. For instance, already modified videos with dialogue that was not original to the video may be submitted (e.g., already dubbed video) or videos with modified image data (e.g., "deepfakes") may be submitted. To prevent fraudulent, defamatory, or other injurious conduct, in some embodiments, an evaluation of the validity of a video to undergo translation may be performed. FIG. 9 is a high-level flowchart illustrating methods and techniques to implement determining whether to accept a source video for translation, according to some embodiments.

As indicated at 910, a received source video may be evaluated for inconsistencies between spoken audio portion(s) and/or image data of the source video, in some embodiments. For example, lip or other facial image data may be extracted and compared with the extracted spoken audio. A discriminator network (or other neural network-based detection model), similar to those discussed above with regard to FIGS. 4 and 5, may be implemented to detect whether the spoken audio portions match or are consistent with the lip or other facial image data. Other kinds of inconsistencies may be detected, in some embodiments. For example, inconsistencies in the audio alone of the video may be detected, such as indications of splicing, dubbing, or other prior audio modifications may be performed. In some embodiments, image data alone may indicate an inconsistency, such as artifacts or other anomalies, similar to those discussed above.

As indicated at 930, a received video with detected inconsistencies may be rejected. For example, an error indication or other notification may be sent in response to the request indicating one or more validity reasons or concerns for the source video. As indicated at 940, translation of the source video may be allowed if inconsistencies are not detected, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 10:
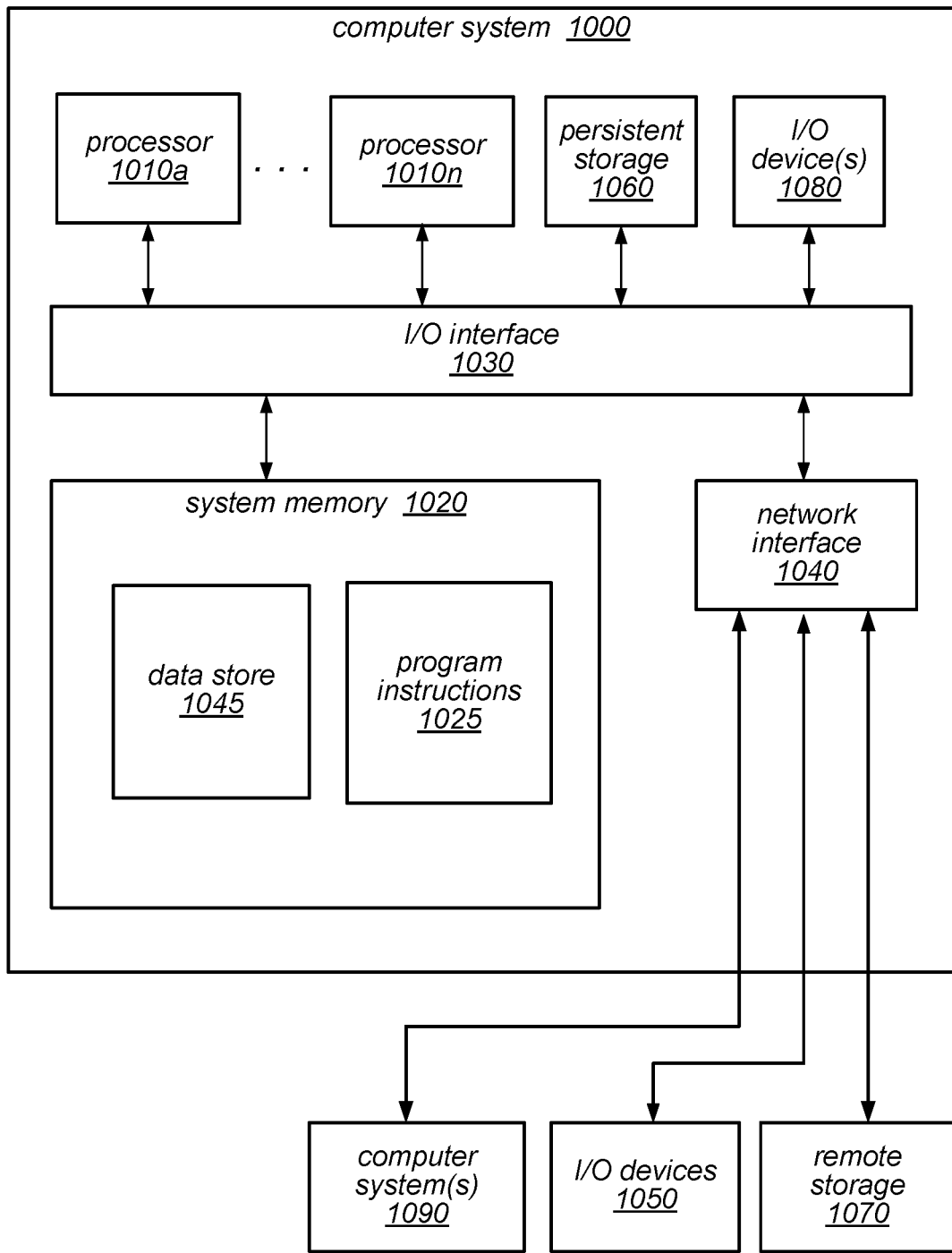
FIG. 10 is an example computer system, according to various embodiments.

FIG. 10 is a block diagram illustrating a computer system that may implement model-based dubbing to translate spoken audio in a video, according to various embodiments, as well as various other systems, components, services or devices described above. For example, computer system 1000 may be configured to implement hierarchy storage nodes that maintain versions of a hierarchical data storage service, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in native binary, any interpreted language such as Java™ byte-code, or in any other language such as C/C++, Java™, etc., or in any combination thereof. For example, in the illustrated embodiment, program instructions 1025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/HIERARCHICAL DATA STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the hierarchy storage nodes or transaction log store described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to implement a translation service, the translation service configured to:
      receive a request that causes generation of a translated version of a source video that comprises one or more audio portions spoken in a first language;
      evaluate the source video to determine an inconsistency between the audio portions and corresponding facial movement in image data of the source video; and
      in response to the determination of the inconsistency based on the evaluation of the source video:
         extract, from the source video, the audio portions in the source video to generate respective semantic graphs for the audio portions;
         convert the respective semantic graphs into a second language to generate text for the audio portions in the second language;
         generate respective new audio portions translated from the first language and spoken in the second language to replace the audio portions spoken in the first language using a first one or more machine learning models, wherein the first one or more machine learning models includes a first generative adversarial network (GAN) machine learning model that uses the text generated in the second language as input to generate the new audio portions spoken in the second language;
         for at least one of the new audio portions, modify respective facial movement in the image data in the source video to correspond to a change in the audio portions after being translated from the first language to the second language using a second machine learning model trained to modify the respective facial movement in the image data to correspond to the second language, wherein the second machine learning model is a second generative adversarial network (GAN) machine learning model that uses the at least one of the new audio portions translated from the first language and spoken in the second language as input to generate the modification to the image data of the source video; and update the source video with the new audio portions and the modified facial movement in the image data for the at least one new audio portion to generate the translated version of the source video.

2. The system of claim 1, wherein translation service is further configured to:

for another one of the new audio portions:
determine that a speaker of the other one new audio portion is not visible, wherein the update of the source video with the other one new audio portion is performed without applying the second machine learning model to modify respective facial movement in the image data in the source video.

3. The system of claim 1, wherein the translation service is further configured to:

receive a request that causes generation of another translated version of another source video;

evaluate the other source video for inconsistencies between spoken audio portions and corresponding facial movement in image data of the other source video; and in response to detection of an inconsistency, reject the translation of the other source video.

4. The system of claim 1, wherein the extracting the audio portions in the source video to generate respective semantic graphs for the audio portions determines an emotion of the audio portions.

5. A method, comprising:

receiving, via a network interface, a source video that comprises one or more audio portions spoken in a first language;

evaluating the source video to determine an inconsistency between the audio portions and corresponding facial movement in image data of the source video; and in response to determining the inconsistency based on the evaluation of the source video:

extracting, from the source video, the audio portions in the source video to generate respective semantic graphs for the audio portions;

converting the respective semantic graphs into a second language to generate text for the audio portions in the second language;

applying a first one or more machine learning models to respectively replace the audio portions spoken in the first language with new audio portions translated from the first language and spoken in the second language, wherein the first one or more machine learning models include a first generative adversarial network (GAN) machine learning model that uses the text generated in the second language as input to generate the new audio portions in the second language;

for at least one of the new audio portions, applying a second machine learning model trained to modify respective facial movement in the image data in the source video to correspond to a change in the audio portions after being translated from the first language to the second language, wherein the second machine learning model is a second generative adversarial network (GAN) machine learning model that uses the at least one of the new audio portions translated from the first language and spoken in the second language as input to generate the modification to the image data; and providing a translated version of the source video that comprises the new audio portions and the modified facial movement in the image data for the at least one new audio portion for playback.

6. The method of claim 5, further comprising:

for another one of the new audio portions:
determining that a speaker of the other one new audio portion is not visible, wherein the update of the source video with the other one new audio portion is performed without applying the second machine learning model to modify respective facial movement in the image data in the source video.

7. The method of claim 5, wherein the extracting the audio portions in the source video to generate respective semantic graphs for the audio portions determines an emotion of the audio portions.

8. The method of claim 5, further comprising:

receiving, via the network interface, a request that causes generation of another translated version of another source video;

evaluating the other source video for inconsistencies in image data of the other source video; and in response to detecting an inconsistency, rejecting the translation of the other source video.

9. The method of claim 5, wherein the extracting the audio portions in the source video to generate respective semantic graphs for the audio portions determines outer time boundaries for translating the audio portions.

10. The method of claim 5, further comprising determining one or more respective voice features for the audio portions according to a cepstrum analysis of the audio portions, wherein the first one or more machine learning models are trained to generate the new audio portions further based on the one or more respective voice features.

11. The method of claim 5, further comprising:

in response to receiving a request for the source video in the second language, performing the extracting, the converting, the applying the first one or more machine learning models, the applying the second machine learning model, and the providing for incremental portions of the source video.

12. The method of claim 5, further comprising:

receiving a request to generate the translated version of the source video;

wherein the extracting, the converting, the applying the first one or more machine learning models, the applying the second machine learning model, and the providing are performed in response to the request; and storing the translated version of the source video.

13. The method of claim 5, wherein the source video is received from a first client application that is a participant in a video communication with a second client application and wherein providing the translated version of the source video comprises sending the translated version of the source video to the second client application.

14. One or more non-transitory, computer-readable storage media, storing program instructions that when executed on or across one or more computing devices cause the one or more computing devices to implement:

receiving, via a network interface, a request that causes generation of a translated version of a source video that comprises one or more audio portions spoken in a first language;

evaluating the source video to determine an inconsistency between the audio portions and corresponding facial movement in image data of the source video; and in response to determining the inconsistency based on the evaluation of the source video:

extracting, from the source video, the audio portions in the source video to generate respective semantic graphs for the audio portions;

converting the respective semantic graphs into a second language to generate text for the audio portions in the second language;

applying a first one or more machine learning models to respectively replace the audio portions spoken in the first language with new audio portions translated from the first language and spoken in the second language, wherein the first one or more machine learning models include a first generative adversarial network (GAN) machine learning model that uses the text generated in the second language as input to generate the new audio portions in the second language;

for at least one of the new audio portions, applying a second machine learning model trained to modify respective facial movement in the image data in the source video to correspond to a change in the audio portions after being translated from the first language to the second language, wherein the second machine learning model is a second generative adversarial network (GAN) machine learning model that uses the at least one of the new audio portions translated from the first language and spoken in the second language as input to generate the modification to the image data; and updating the source video with the new audio portions and the modified facial movement in the image data for the at least one new audio portion to generate the translated version of the source video.

15. The one or more non-transitory, computer-readable storage media of claim 14, storing further program instructions that when executed on or across the one or more computing devices cause the one or more computing devices to further implement:

for another one of the new audio portions:

determining that a speaker of the other one new audio portion is not visible, wherein the update of the source video with the other one new audio portion is performed without applying the second machine learning model to modify respective facial movement in the image data in the source video.

16. The one or more non-transitory, computer-readable storage media of claim 14, wherein the extracting the audio portions in the source video to generate respective semantic graphs for the audio portions determines outer time boundaries for translating the audio portions.

17. The one or more non-transitory, computer-readable storage media of claim 14, storing further program instructions that when executed on or across the one or more computing devices cause the one or more computing devices to further implement storing the translated version of the source video.

18. The one or more non-transitory, computer-readable storage media of claim 14, storing further program instructions that when executed on or across the one or more computing devices cause the one or more computing devices to further implement:

determining that at least a portion of the translated version of the source video does not satisfy one or more criteria for providing the translated version of the video; and in response to determining that the portion of the translated version of the source video does not satisfy the one or more criteria for providing the translated version of the video, rejecting the translated version of the other source video.

19. The one or more non-transitory, computer-readable storage media of claim 18, storing further program instructions that when executed on or across the one or more computing devices cause the one or more computing devices to further implement performing at least one of:

applying a different machine learning model trained to respectively replace the audio portions with new audio portions spoken in the second language according to the respective semantic graphs; or applying another different machine learning model trained to modify respective facial movement in image data in the source video to correspond to the second language.

20. The one or more non-transitory, computer-readable storage media of claim 14, wherein one or more computing devices are implemented as part of a video distribution service, and wherein the request to cause the generation of the source video is a request to initiate playback of the source video at a client device that receives the translated version of the source vide from the video distribution service.

* * * * *